June 4, 1935. W. H. PARKER ET AL 2,003,901
PISTON METER
Filed May 19, 1931 4 Sheets-Sheet 1
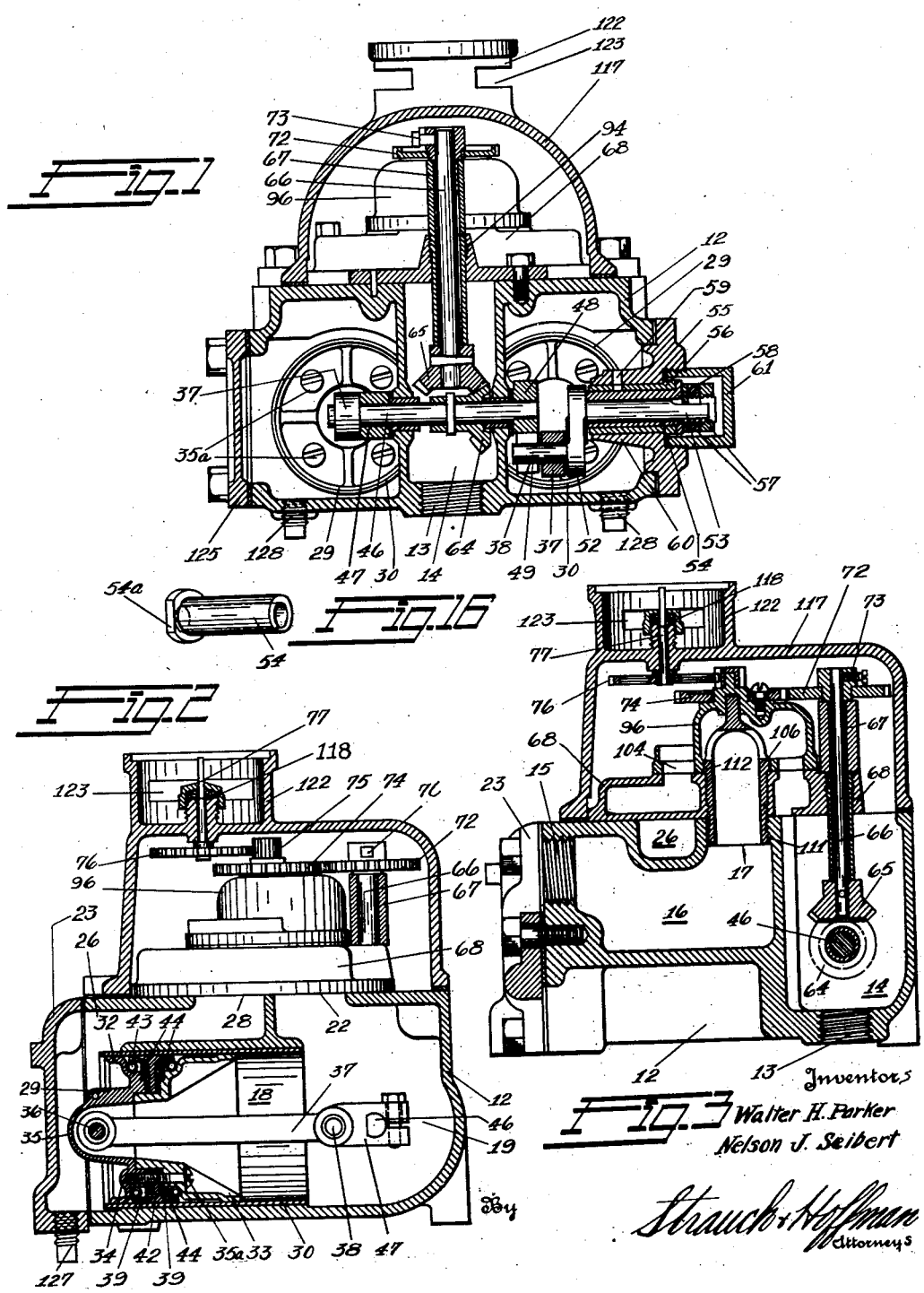

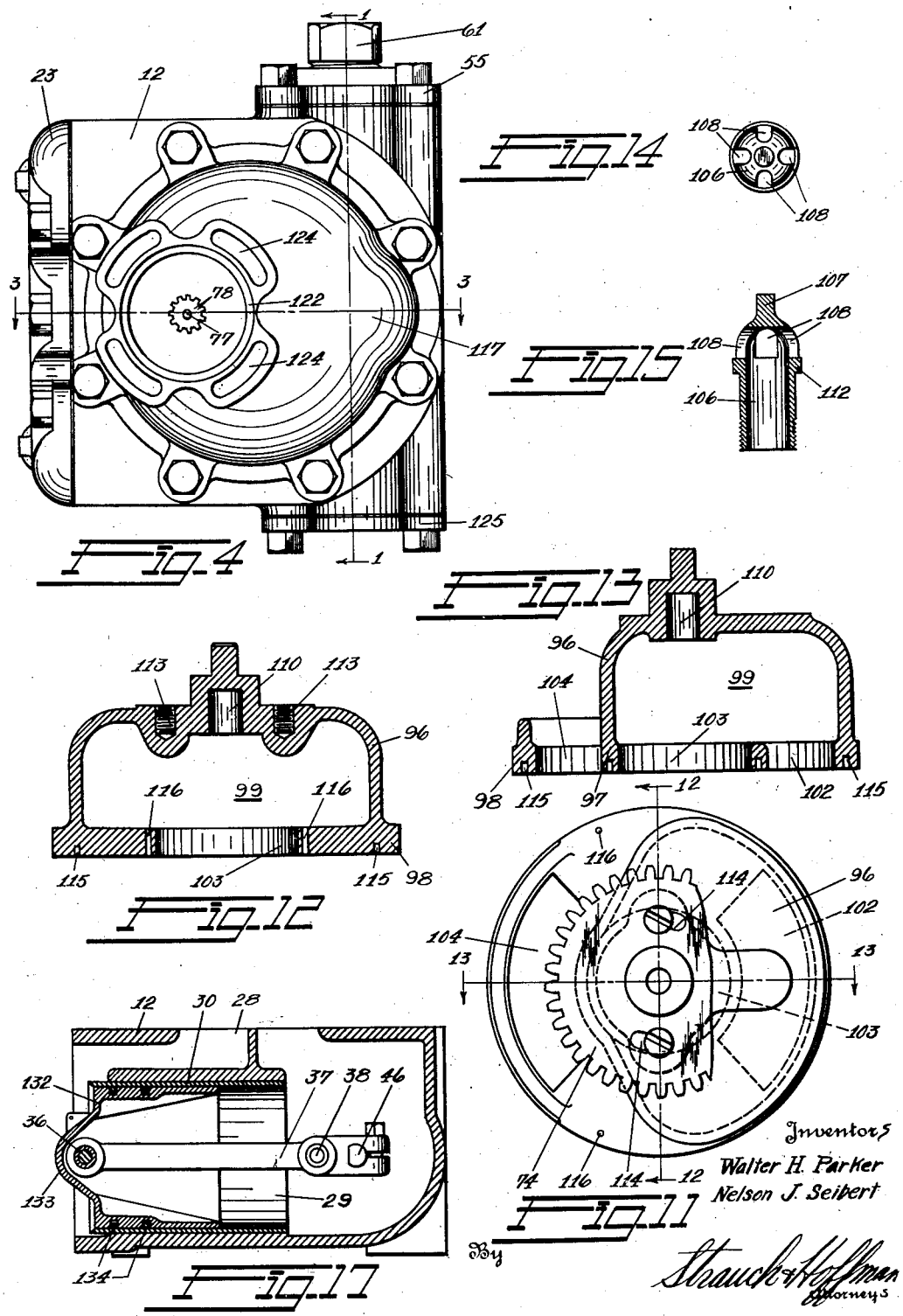

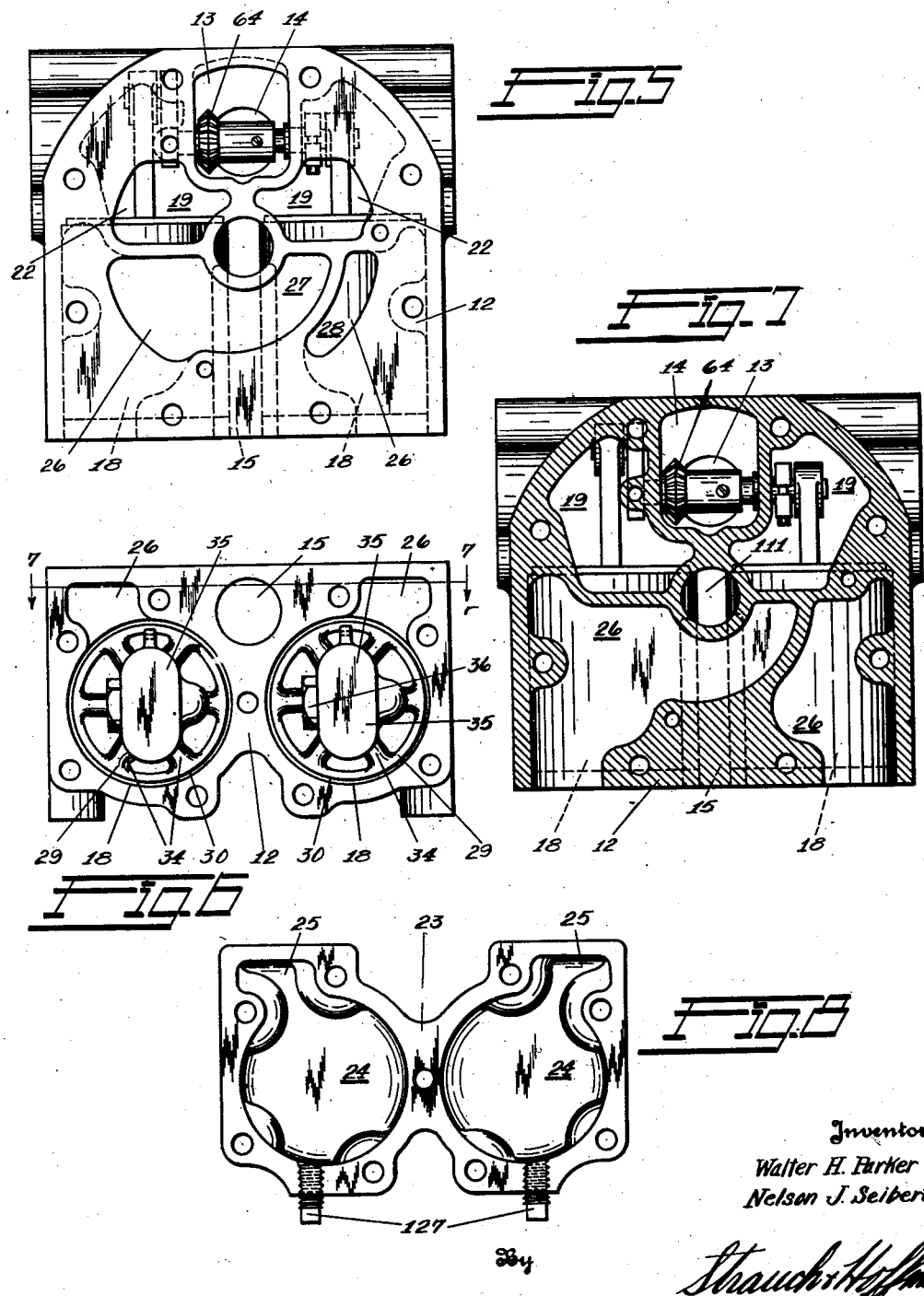

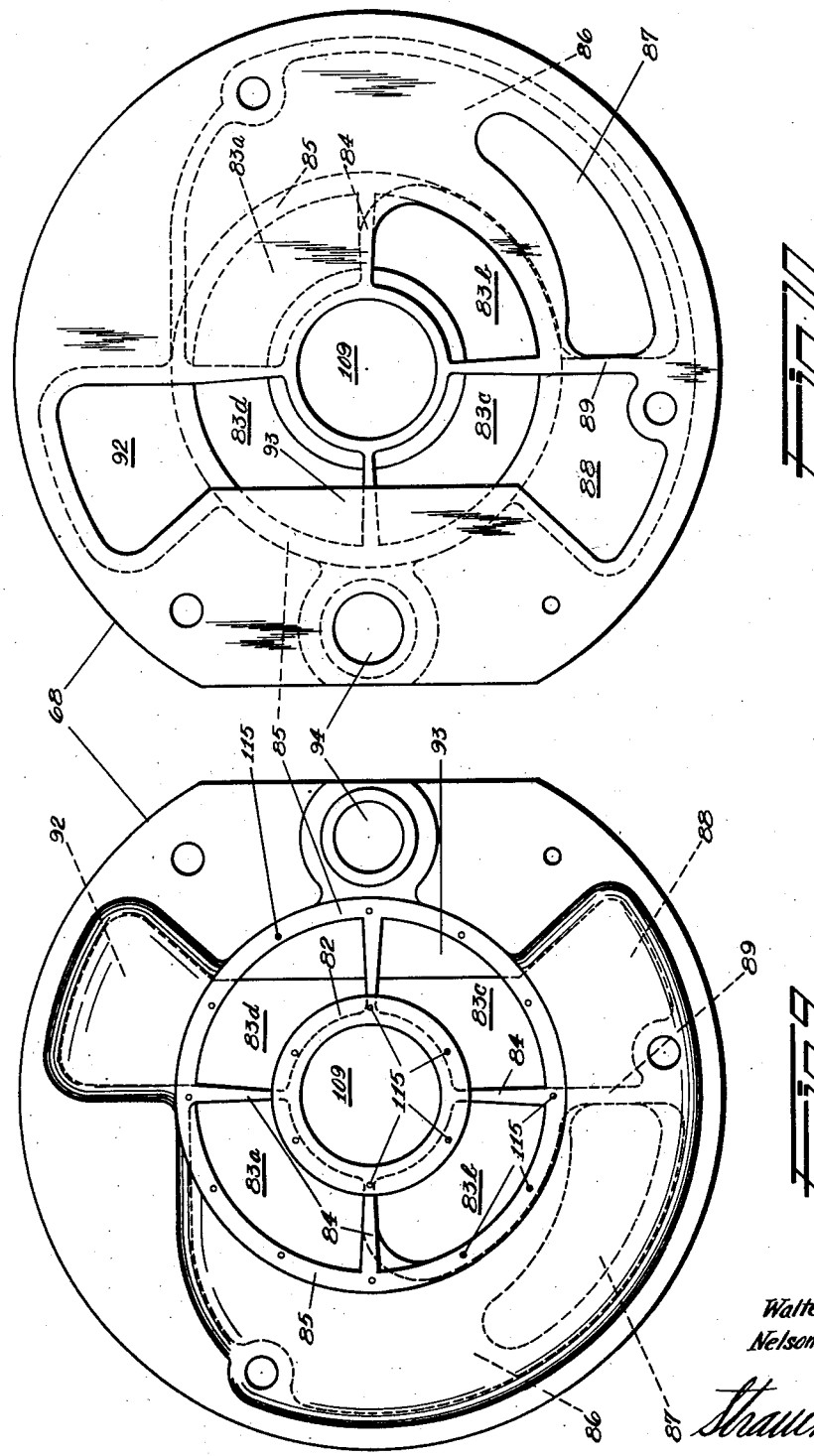

Patented June 4, 1935

2,003,901

UNITED STATES PATENT OFFICE 2,003,901

PISTON METER

Walter H. Parker and Nelson J. Seibert, Pittsburgh, Pa., assignors to Pittsburgh Equitable Meter Company, Pittsburgh, Pa., a corporation of Pennsylvania Application May 19, 1931, Serial No. 538,545

4 Claims. (Cl. 73—30)

This invention relates to fluid metering mechanism for accurately indicating the volume of fluid passing through the meter. More particularly, the invention relates to fluid metering mechanisms of the double acting piston type.

Although this invention is not limited thereto, it is particularly adaptable for use with gasoline dispensing systems wherein the gasoline is adapted to be rapidly passed from a storage tank to tanks provided on automobiles or other vehicles. In the dispensing of gasoline, it is necessary that the metering mechanism be extremely accurate within small variations, since inaccurate mechanisms are condemned by the municipalities and may not be used until the inaccuracy is corrected and the meter re-tested. Furthermore due to the relative rough handling given these mechanisms by inexperienced operators, it is necessary that the parts be strong and not easily de-ranged. Furthermore, these meters must be capable of large quantity production, and the parts must be readily exchangeable to facilitate servicing of the meters.

One object of this invention is to provide a rugged and accurate fluid meter of the piston type capable of quantity production at a reasonable cost, and the parts thereof being easily removable to facilitate repairs and replacements.

Another object of this invention is to provide a fluid meter of the double acting piston type in which the pistons are caused to reciprocate by the pressure of the fluid and wherein a calibrating device is provided which is readily accessible without disassembling any of the parts, whereby the accuracy of the metering mechanism may be easily corrected.

Another object of the invention is to provide a fluid metering mechanism of the piston type, comprising two cylinders receiving measured quantities of fluid successively at both ends of the cylinders, whereby the flow of fluid is substantially smooth, and wherein any dead center position of the pistons is avoided.

A further object of this invention is to provide a fluid measuring mechanism embodying double acting pistons in combination with a novel rotary valve mechanism in which the fluid is automatically admitted to and discharged from both ends of each piston from a common source of supply to a common discharge connection.

A further object of this invention is to provide a novel piston for association with a metering mechanism of the piston type in which leakage of the fluid past the piston is avoided in a simple manner.

A further object of the invention is to provide a metering and dispensing mechanism of the double acting piston type embodying a rotary valve for controlling the flow of fluid, wherein the fluid being dispensed acts as a cushion and a lubricant for the moving parts and wherein the fluid provides an effective seal around the rotary valve mechanism.

A further object of the present invention is to provide fluid dispensing metering mechanisms of the double acting piston type wherein the pistons are so constructed and arranged that air pockets in the measuring chambers are avoided and accuracy of the mechanism is assured.

A further object of this invention is to provide a metering mechanism of the piston type wherein the registering dials may be readily attached to and detached from the metering mechanism by a simple connection which allows radial adjustment of the indicating dials and movement.

A further object of the present invention is to provide a metering mechanism of the double acting piston type in which the pistons may be readily disconnected from the remaining mechanism through openings having readily removable covers whereby the pistons may be disconnected from the meter without disassembling the mechanism as a whole.

A further object of this invention is the provision of a sealing device for use in connection with a piston type metering mechanism for fluid in which the seal between the piston and its cylinder wall is obtained by a novel form of leather gasket provided with a support wherein the leather is prevented from rolling back upon itself to cause a binding action with regard to the cylinder wall, and yet in which an efficient seal is always provided.

A further object of this invention is provision of a fluid metering mechanism of the double acting piston type in combination with a rotary valve for distributing the fluid, the pistons being connected to a common crank shaft with their crank arms 90° apart, the rotary valve mechanism being so arranged that the liquid is forced into and measured by the cylinder on both sides of the piston, and is so timed that as one end of each cylinder is taking liquid in, the other end is discharging it.

A further object of the present invention is to provide a liquid measuring apparatus of the piston type in which all the moving parts of the mechanism are lubricated by the liquid being measured and wherein the liquid acts as a seal to prevent escape of pressure, and to prevent excessive wear.

A further object of the present invention is to provide a fluid measuring mechanism of the piston type embodying a closed chamber having reciprocating pistons therein, the casing being provided with easily accessible drain plugs wherein all of the fluid may be drained from the measuring mechanism when desired without disconnecting any of the operative parts of the same.

These and various other objects of the invention will be apparent from the following description and appended claims when taken in connection with the accompanying drawings wherein:

Figure 1 is a section taken through the central line of the crank shaft of the meter, substantially on line 1—1 of Figure 4.

Figure 2 is a cross-section through one piston and cylinder, the rotary valve and its gear drive mechanism being shown in elevation.

Figure 3 is a sectional view through the valve, the valve bearing, and the valve port, substantially on line 3—3 of Figure 4.

Figure 4 is a top plan of the meter with the registering mechanism disconnected therefrom.

Figure 5 is a top plan of the main casing with all covers removed and with the valve mechanism removed.

Figure 6 is an end view of the casing shown in Figure 5.

Figure 7 is a sectional view thereof taken on line 7—7 of Figure 6.

Figure 8 is an elevation of the cover member adapted to close the end of the casing shown in Figure 6.

Figures 9 and 10 are a top plan and bottom plan, respectively, of the removable valve seat member on an enlarged scale.

Figure 11 is a top plan on an enlarged scale of the rotary valve member with the driving gear thereof partly shown.

Figure 12 is a sectional view thereof taken substantially on line 12—12 of Figure 11 with the driving gear removed.

Figure 13 is a sectional view taken substantially on lines 13—13 of Figure 11 with the driving gear removed.

Figures 14 and 15 are a top plan and vertical section respectively of the ported bearing for the rotary valve.

Figure 16 is a perspective view of the eccentric bushing for adjustably supporting the crank pin of one piston.

Figure 17 is a broken section through one cylinder showing a modified form of piston.

Referring to the drawings wherein like reference characters indicate like parts in the several views, the main body of the meter comprises a ported casting 12, shown in plan in Figure 5. As seen in Figures 5 and 6, the casting 12 is provided with a plane upper surface having a series of ports therein leading into the hollow interior of the casting. The casting is provided with an inlet connection 13 communicating with a vertically extending substantially rectangular passageway 14. The casting 12 is further provided with an outlet connection 15 extending from one side face and communicating with a chamber 16 (see Figure 3) which in turn is in communication with vertically extending chamber 17.

The casting 12 is further provided with two parallel cylinders 18 which open into the end face to which the outlet opening 15 is connected. The open rear ends of the cylinders 18 communicate with individual chambers 19 which partly surround the vertical passageway 14 as seen more clearly in Figure 7. Each chamber 19 communicates with an opening 22 through the upper face of the casting 12.

The end of casting 12 through which the outlet connection 15 extends is normally closed by a cylinder head 23 provided with bolt holes in alignment with similar threaded holes in the casting 12 for securing the cylinder head in fluid tight engagement with the casting. Cylinder head 23 has two recesses 24 therein in alignment with the open ends of cylinders 18, each recess being provided with a connecting recess 25. Each recess 25 aligns with the open end of its chamber 26 in casting 12, and chambers 26 have openings 27 and 28 through the upper face of the casting 12. As seen in Figure 5 the openings 27 and 28 are arranged close together, one opening being radially spaced from the other.

Each cylinder 18 has a removable non-corrosive lining 30 therein, such as brass or bronze in which piston 29 reciprocates, the linings being sweated or otherwise secured in position. The pistons 29 are similar in construction and one only will be described. Each piston 29 preferably includes a body portion 32 and a follower 33, the body portion 32 being formed of bronze or some similar relatively hard and non-corrosive metal and the follower being formed of aluminum, zinc or some relatively light non-corrosive metal.

The body 32 includes a radial surface provided with a plurality of lugs 34 adapted to receive securing bolts 35a which connect the follower 33 to the body 32. The body 32 is further provided with a central outwardly extending lug 35 which projects beyond the head of the piston as seen in Figure 2, and is adapted to receive the wrist pin 36 for securing a connecting rod 37 to the piston. The projecting lugs 35 of the piston body are adapted to project into the chamber 24 in the cylinder head 23 to facilitate assembly and disassembly of the parts. When the cylinder head 23 is removed, the wrist pin 36 may be readily disconnected since the wrist pin and the lug 35 project clear of the cylinder wall. Therefore the piston may be easily disconnected from its connecting rod 37.

Each connecting rod 37 has an opening in its opposite end for the reception of a crank pin 38 as described hereinafter more fully.

As seen in Figure 2, the piston body 32 has a relatively wide groove cut in the perimeter thereof for the reception of sealing means. This sealing means is of novel construction and forms an important feature of this invention. Within the groove in the body portion 32 is positioned two flexible sealing rings 39 preferably of leather or the like which are positioned on opposite sides of a central retaining ring 42, which has its opposite faces curved whereby the flexible rings 39 are bent to face in opposite directions. Within the groove provided in the body 32 and beneath the overhanging portions of the sealing rings 39 are coiled springs 43 which are retained in position partly by the metal retaining ring 42 and partly by curved metallic washers 44 seating against the leather rings 39. When the sealing device has been assembled as above described, the bolts 35 which secure the body 32 to the follower 33 also secure the sealing device as assembled in the groove of the body of the piston, as seen in Figure 2.

The curved surfaces of the retaining ring 42 and the washers 44 serve to effectively retain the sealing devices and the leather rings 39 in position and yet prevent the leather from rolling back against the cylinder wall upon reciprocation of the piston. Such a rolling back would cause a binding of the cylinder with respect to the piston, similar to the action of a ball in a ball clutch and would soon wear out the parts, in addition to causing excessive and unnecessary friction. The spiral springs 43 assist in maintaining the bent-over portions of the leather ring in fluid tight engagement with the walls 28 of the cylinders.

A crank shaft 46 extends across the casting 12 and through the vertical passageway 14 through which fluid enters the metering apparatus. Shaft 46 has flattened portions near each end and has secured thereto the two crank arms 47 and 48 to connect to the connecting rods 37. One crank pin 38 carried by its arm 47 has the end of its connecting rod 37 engaged therewith, with no provision for adjustment or calibration. Provision is made for calibration and adjustment of the meter by radial movement by the other crank pin 38, by the following construction:

Referring to Figure 1 it will be seen that the crank arm 48 is provided with a slot 49 in which is positioned the crank pin 38. Crank pin 38 is carried by its crank arm 52 having a shaft 53 supported by an eccentric bushing 54 carried by removable closure plate 55. Closure plate 55 has an inwardly extending boss 60 supporting a concentric bushing 56 for receiving the eccentric bushing 54. It will be seen from Figure 1 that the shaft 53 is in axial alignment with the crank shaft 46. Thus rotation of the eccentric bushing 54 will have the effect of moving the crank pin 38 radially with respect to the crank shaft 46 to thereby vary the rotation imparted to crank shaft 46 in response to reciprocation of one piston 29.

In order to adjust the eccentric bushing, shaft 53 is threaded on its outer end for the reception of two lock nuts 57 and is further provided with a slot in which the tongue of washer 58 is slidably received. As seen in Figure 16, eccentric bushing 54 has a flange 54a on its outer end which engages the end of the concentric bushing 56, bushing 56 being similarly flanged for engagement with a corresponding shoulder on the plate 55. The inwardly extending boss 60 of plate 55 is provided with an opening 59, the concentric bushing 56 being provided with a corresponding opening, whereby the fluid being metered may pass through the openings and effectively lubricate the bearing between the concentric and eccentric bushings. Plate 55 is provided with a threaded cap 61 which normally covers the end of shaft 53 and lock nuts 57, cap 61 being secured in fluid tight engagement against a gasket.

By the mechanism as above described, calibration of the meter may be simply and readily accomplished without disconnecting the meter and without disassembling the parts, and without loss of excessive amounts of the liquid being measured. It is merely necessary to remove the cap 61, loosen the lock nuts 57, and by a suitable wrench which engages over the flattened portions on the flanged end of eccentric bushing 54, said bushing may be rotated. It will be clear that rotation of bushing 54 will either increase or decrease the eccentricity of shaft 53 moving the crank pin 38 radially with respect to crank shaft 46. When the lock nuts 57 are again tightened the shaft 53 is locked in position to eccentric bushing 54, and these parts rotate together. An extremely simple and accurate calibrating mechanism is thus provided.

The crank shaft 46 has secured thereto a bevel gear 64 positioned within chamber 14 which drives a meshing gear 65 secured to a shaft 66 extending vertically through a hollow bearing 67. Bearing 67 is threaded into an opening 94 in a stationary valve member 68 suitably secured to the upper face of casting 12 by bolts.

At its upper end shaft 66 has secured thereto a gear 72 by a set screw 73 or by similar means. Gear 72 is in mesh with gear 74 which has secured thereto a pinion 75 which meshes with a gear 76 on a shaft 77. Shaft 77 is adapted to receive a pinion 78 (Figure 4) for driving a registering mechanism including dials such as in common use on water meters. The reduction gearing just described transmits directly the rotation of crank shaft 46 to the registering mechanism.

The stationary valve plate 68 is shown in detail in Figures 9 and 10. Member 68 is provided with a plane face for engagement with a corresponding upper face of casting 12. For convenience in casting the parts and assembling the same, valve member 68 is shown as a separate casting, but it will be understood that members 12 and 68 could be formed integrally. Valve member 68 is provided with a central opening 109 formed by a cylindrical wall having a flanged upper surface 82 (Figure 9). Surrounding the surface 82 are four arcuate ports 83a, 83b, 83c and 83d defined by radially extending ribs 84 and an outer circular wall 85. The arcuate port 83a is connected by an opening through its side wall to a chamber 86 which extends around arcuate opening 83b but is separated therefrom by a solid wall. Chamber 86 communicates with an arcuate passage way 87 in the lower face of valve member 68. Arcuate opening 83b extends the full depth of stationary valve member 68 as seen in Figures 9 and 10. Arcuate opening 83c also extends through stationary valve member 68 and communicates with a chamber 88 adjacent chamber 86 but separated therefrom by a solid partition 89. Arcuate opening 83d is similar to 83c and connects with a chamber 92. A flange 93 extends across the bottom of openings 83c and 83d. The opening 94 is threaded for the reception of bearing 67.

The valve member 68 is assembled with the main casting 12 whereby the bearing 67 extends downwardly into the vertical chamber 14, and arcuate opening 83b is aligned with a portion of the opening 27, the closed bottom of opening 83a closing off the remainder of the opening 27. Opening 83c which is in communication with chamber 88 is positioned over the opening 22 of one chamber 19. Arcuate opening 83d is similarly positioned over opening 22 of the other chamber 19. Arcuate opening 83a is in communication with opening 28 by way of corresponding and similar opening 87 and chamber 86.

The flow of the liquid through arcuate openings 83a, 83b, 83c and 83d is controlled by a rotary valve 96 pivoted above stationary valve member 68. Rotary valve member 96 is shown in detail in Figures 11, 12, and 13. As shown, valve 96 comprises a hollow member having two continuous circular surfaces 97 and 98 for engagement with the faces 82 and 85 of the valve member 68. Valve member 96 has a chamber 99, and an arcuate shaped opening 102 communicating with the chamber from the bottom of the valve member. A central opening 103 of the same diameter as opening 109 of stationary member 68 communicates with the central chamber 99. Exterior of chamber 99 is an arcuate opening 104 which does not communicate with chamber 99. With the exception of the openings 102, 103 and 104, the remainder of the lower face of valve member 96 is plain and is adapted to close the various arcuate openings 83a, 83b, 83c and 83d in order.

Rotary valve member 96 is pivotally supported upon a centrally positioned hollow bushing 106 shown in Figures 14 and 15 which has an upstanding bearing member 107 adapted to engage an opening 110 of valve 96. Bushing 106 has a plurality of openings 108 communicating with the central hollow portion thereof. Bushing member 106 is adapted to be threadedly engaged with the central opening 111 of the casting 12, the unthreaded portion of bushing 106 having a working fit with opening 109 of stationary valve member 68. A flange 112 on bushing 106 engages the upper surface of valve member 68 and also provides a bearing for rotary valve 96.

Rotary valve member 96 is adapted to be driven by driven gear 74 which is secured to threaded openings 113 (Figure 12) in the upper face thereof by bolts passing through arcuate slots 114 in the gear.

The meeting surfaces 82 and 85 of stationary valve member 68 and the surfaces 97 and 98 of rotary valve 96 are each provided with a series of pockets 115, and rotary valve 96 is further provided with a plurality of openings 116, at least two of said openings leading from the chamber 99 through the face 97, as seen in Figure 12, and others of said openings passing through the outer rim portion 98 of the rotary valve as seen in Figure 11. When the metering mechanism is in operation and liquid is passing through the various chambers, the liquid may pass through the openings 116 and as the rotary valve 96 turns, a drop of the liquid is deposited in each pocket 115. The meeting faces 82 and 85, and 97 and 98 are accurately machined for a close fit and the liquid in the pockets 115 forms an efficient seal and anti-friction lubricant between the faces. Openings 116 supply liquid to the various pockets such that an efficient thin film is interposed at all times between the moving faces.

An enclosing cover 117 is secured to the upper face of the casting 12 to form a distributing chamber for liquid being measured and to support the shaft 77 and gear 76. Shaft 77 is surrounded by a suitable packing gland 118 to prevent leakage of fluid. Cover 117 is provided with an upstanding flange 122, having slots 123 therein in order to obtain access to the packing gland 118. As seen in Figure 4, the member 122 is provided with an upper surface having arcuate slots 124 therein to which may be bolted the registering dial mechanism of the meter.

As previously described, the removal of the cylinder head 23 from the casting 12 gives access to the wrist pins 36 whereby the pistons may be disconnected from their connecting rods.

Furthermore, the casting 12 is provided with openings in alignment with the crank shaft 46, one such opening being closed by plate 55 which carried the calibrating device, previously described. The other opening in the casting 12 is normally closed by cover 125 secured by suitable bolts. Thus, by removal of the cylinder head 23, cover 125, and cover plate 55, complete access may be had to the cylinders, whereby the pistons may be disconnected from the connecting rods at one end, and removed from the casting 12. Furthermore, the connecting rods 37 may also be removed through the openings covered by members 55 and 125.

The operation of this embodiment of the invention is as follows:

The parts are assembled as shown in Figures 1 to 4, with the various cover members secured in fluid tight engagement, and with the registering mechanism, not shown, secured to member 122 and having a suitable gearing engaged with gear 78. With the inlet and outlet connections connected respectively to supply and outlet pipes, the fluid may then be allowed to enter the meter. The pressure of the liquid, will cause reciprocation of the pistons and liquid will pass by inlet connection 13 to vertical chamber 14 and then upwardly into the chamber defined by cover 117. As the liquid passes through the meter, it may enter the opposite ends of the two cylinders which thus act as measuring chambers. It will be noted that since the connecting rods for the pistons are connected to the crank shaft 46 at 90° angles with respect to each other, there will be no dead center for the meter and the mechanism will start at once irrespective of the position in which the meter was stopped. As the liquid forces the pistons to reciprocate, the crank shaft 46 drives the vertical shaft 66, causing gear 74 and rotary valve 96 to rotate, and causing the shaft 77 to be rotated to register on the registering mechanism. As valve 96 rotates the port 104 therein registers in succession with the ports 83a, 83b, 83c and 83d of the stationary valve member 68. Liquid may thus enter the opposite ends of the cylinders by the ported chambers as described. Furthermore, as valve 96 rotates, port 102 also registers with openings 83a, 83b, 83c and 83d to allow liquid to pass from the filled ends of the cylinders into the chamber 99 of the valve and then through openings 108 and downwardly into chamber 17, chamber 16, and out of outlet connection 15.

Accurate calibration of the meter may be accomplished by removal of the cap 61, Figure 1, and rotation of the eccentric bushing 54. This adjustment may be accomplished after the meter has been installed in final position and none of the parts of the meter need be disconnected or disassembled. Drain openings are provided in the casing to allow the liquid therein to escape, when the meter is to be removed. These openings are provided, two in the cylinder head 23, which are closed by plugs 127, and two in casting 12 adjacent the opposite ends of the cylinders and closed by plugs 128, as seen in Figure 1. Furthermore, if service is to be discontinued for any appreciable length of time and there is a possibility of the liquid freezing within the meter, the plugs 127 and 128 can be removed since they are in an accessible position, and being in the lowest part of the casing, all liquid will drain from the meter.

A modified form of piston is shown in Figure 17, wherein the piston 132 is formed in one piece and may be any light metal which is non-corrosive in accordance with the liquid to be metered. The piston 132 has aperatured lug 133 projecting forwardly beyond the end thereof for the reception of the wrist pin 36 which is secured thereto in a manner similar to the previous form of piston described. Metal sealing rings 134 are used with this embodiment, it being understood, however, that the sealing leathers of the preferred form may be used. The hollow or skirt portion of the piston has the walls thereof sloping outwardly and upwardly as seen in Figure 17 whereby the formation of air or gas pockets is avoided. The entering liquid as it arises within the hollow piston will force all of the gas or air ahead of it upwardly and out of the meter. Also the various curved surfaces of the piston cause a whirling action of the liquid to thus effectively sweep out all air or gas which might be trapped by sudden ingress of liquid.

This elimination of air or gas pockets is an important practical feature of the present invention. If air or gas pockets are retained in the meter, inaccurate metering is inevitable. Due to the varying supply pressures of the liquid any trapped air or gas will change its volume in accordance with the varying pressure, and therefore varying quantities of liquid may enter the measuring chambers. Furthermore a variation in temperature will change the volume of air or gas trapped in a meter, causing inaccuracy of registration. By the novel construction herein disclosed, no such pockets are formed and accurate registration is secured.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. A fluid meter comprising a casing having a plurality of ports in one face thereof; a plurality of cylinders in said casing having pistons therein; a rotary valve cooperating with said ports to control the flow of fluid to and from said cylinders; a hollow bearing member pivotally supporting said rotary valve; inlet and outlet connections in said casing; the interior of said hollow bearing member forming a discharge chamber, said chamber being connected to said outlet connection.

2. A fluid meter comprising a casing having a plurality of arcuate ports in one face thereof; a plurality of cylinders in said casing having pistons therein; a rotary valve cooperating with said arcuate ports to control the flow of fluid to and from said cylinders; inlet and outlet connections in said casing; a cover secured to said casing over said valve and defining a fluid chamber in communication with one of said connections; and a hollow bearing member pivotally supporting said rotary valve, the interior of said bearing member defining a fluid chamber in communication with the other of said connections.

3. In a liquid metering apparatus, means forming a measuring chamber; said means having a surface provided with a series of ports arranged around a common center for the passage of liquid to and from said measuring chamber; a valve frictionally engaging said surface and rotatable thereover for controlling the passage of liquid through said ports, the meeting faces of said valve and surface being provided with a plurality of circumferentially arranged pockets for the reception of liquid whereby said faces are sealed and the friction therebetween reduced by a film of liquid, one of said meeting surfaces being provided with circumferentially arranged openings alternately communicating with said pockets and with the intake or discharge flow during rotation of said valve, thereby supplying metered liquid to said pockets.

4. A fluid meter comprising a casing having a plurality of cylinders therein, one face of said casing being plane and having openings therethrough communicating with opposite ends of said cylinders; a piston in each cylinder; a crank shaft; a piston rod and crank arm connecting each piston to said crank shaft; a valve seat member having ports therein; a hollow bearing member threadedly engaging said casing and having a shoulder thereon engaging said valve seat member, said valve seat member having a bearing therein and a rotatable valve drive shaft journaled in said bearing and driven from said crank shaft; a valve member rotatably journaled on said hollow bearing member, and means for driving said valve member from said valve drive shaft.

WALTER H. PARKER.
NELSON J. SEIBERT.